(12) United States Patent
Jung et al.

(10) Patent No.: US 10,023,727 B2
(45) Date of Patent: Jul. 17, 2018

(54) COMPOSITION FOR RUBBER BUSHING HAVING VIBRATION ISOLATION AND FATIGUE ENDURANCE CHARACTERISTICS

(71) Applicant: HYUNDAI MOTOR COMPANY, Seoul (KR)

(72) Inventors: Heon Seop Jung, Uiwang-si (KR); Ho Dong Kim, Jecheon-si (KR)

(73) Assignee: Hyundai Motor Company, Seoul (KR)

( * ) Notice: Subject to any disclaimer, the term of this patent is extended or adjusted under 35 U.S.C. 154(b) by 47 days.

(21) Appl. No.: 15/394,444

(22) Filed: Dec. 29, 2016

(65) Prior Publication Data

US 2018/0118923 A1 May 3, 2018

(30) Foreign Application Priority Data

Nov. 2, 2016 (KR) ........................ 10-2016-0145330

(51) Int. Cl.
*C08L 21/00* (2006.01)
*C08K 5/00* (2006.01)
*C08K 13/02* (2006.01)

(52) U.S. Cl.
CPC .................................... *C08K 13/02* (2013.01)

(58) Field of Classification Search
CPC ............. C08K 13/02; C08K 3/30; C08K 5/00
See application file for complete search history.

(56) References Cited

FOREIGN PATENT DOCUMENTS

| KR | 2002-0056063 A | * | 7/2002 | ............. C08L 21/00 |
| KR | 1020020056063 A | | 7/2002 | |
| KR | 2011-0011010 A | * | 2/2011 | ............... C08K 3/30 |
| KR | 1020110011010 A | | 2/2011 | |

* cited by examiner

*Primary Examiner* — Robert Harlan
(74) *Attorney, Agent, or Firm* — Lempia Summerfield Katz LLC

(57) ABSTRACT

A rubber bushing composition and an automotive bushing manufactured by molding the composition are provided. The rubber bushing composition has advanced vibration isolation and fatigue endurance conflicting with each other.

17 Claims, No Drawings

COMPOSITION FOR RUBBER BUSHING HAVING VIBRATION ISOLATION AND FATIGUE ENDURANCE CHARACTERISTICS

CROSS-REFERENCE TO RELATED APPLICATION

This application claims under 35 U.S.C. § 119(a) the benefit of Korean Patent Application No. 10-2016-0145330 filed on Nov. 2, 2016, the entire contents of which are incorporated herein by reference.

BACKGROUND

(a) Technical Field

The present disclosure relates to a composition for rubber bushing having simultaneously advanced vibration isolation and fatigue endurance of the rubber and an automotive bushing manufactured by molding the composition.

(b) Background Art

Various shock reduction devices for reducing shock or vibrations transmitted through roads or the ground may be provided in vehicles. For example, the shock reduction devices include a suspension which prevents vibration generated from the road from being transmitted to the passenger while constituting a lower structure of the vehicle, a stabilizer which promotes driving stability by reducing a rolling phenomenon generated by a vehicle body while the vehicle is turning, a subframe for alleviating shock or vibrations introduced to the vehicle body by tires, and the like. A rubber bushing for alleviating the shock or vibrations is installed and used in the shock reduction devices.

The rubber bushing may be manufactured by vulcanizing and injecting rubber such as natural rubber, butadiene rubber, and styrene-butadiene rubber by adding a filler and other additives. The rubber bushing has an advantage of excellent vibration isolation due to elasticity, but aging of the rubber is generated by an environmental factor (e.g., oxidation by heat, ozone, etc.) and a mechanical factor (e.g., repeated fatigue) when used in an actual field, and thus the bushing is damaged and performance of the vehicle deteriorates to cause discomfort for the passengers accordingly. Further, when the durability problem occurs, only the bushing is hardly replaced and thus various problems including wholly replacing various expensive arms and the like occur. Accordingly, it is important to form a bushing having excellent fatigue endurance as well as vibration isolation.

However, the vibration isolation and the fatigue endurance have a conflict relation due to a characteristic of the rubber material. The vibration isolation refers to an isolation function to prevent vibration from being transmitted from an object as a vibration source. To improve the vibration isolation of the vehicle, for example, a method of reducing dynamic performance by lowering hardness of the rubber bushing is proposed, but in conflict, things that the damage of the vehicle is generated by generating durability damage of the bushing to increase hardness again are repeated. As such, there is technical difficulty in providing a material which simultaneously satisfies vibration isolation and fatigue endurance conflicting with each other in the rubber bushing material.

Therefore, as disclosed herein, a specific raw ingredient is appropriately selected from raw ingredients used in the rubber bushing material and a novel rubber bushing composition which simultaneously satisfies vibration isolation and fatigue endurance is developed by adjusting a mixing ratio between the selected raw ingredients.

The above information disclosed in this Background section is only for enhancement of understanding of the background and therefore it may contain information that does not form the prior art that is already known in this country to a person of ordinary skill in the art.

SUMMARY OF THE DISCLOSURE

The present disclosure has been made to solve the above-described problems associated with prior art.

An object of the present disclosure is to provide a rubber composition for a bushing simultaneously satisfying vibration isolation and fatigue endurance of the rubber conflicting with each other.

Another object of is to provide an automotive bushing component manufactured by molding the rubber composition.

In one aspect, a rubber bushing composition is provided, wherein the rubber bushing composition includes: 100 parts by weight of natural rubber; 20 to 30 parts by weight of fast extruding furnace (FEF), high abrasion furnace (HAF), or a mixture thereof as a filler; 0.5 to 1.5 parts by weight of 2,2,4-trimethyl-1,2-dihydroquinoline (TMQ) as an antioxidant; 1 to 2 parts by weight of N-isopropyl-N'-phenyl-p-phenylenediamine (IPPD) as an antioxidant; 0.8 to 1.5 parts by weight of a sulfur crosslinker; 0.5 to 2 parts by weight of N-cyclohexyl 2-benzothiazole sulfenamide (CBS) as a crosslinking accelerator; 0.2 to 1 part by weight of tetramethylthiuram disulfide (TMTD) as a crosslinking accelerator; 3 to 5 parts by weight of zinc oxide as a crosslinking activator; and 1.5 to 3 parts by weight of stearic acid as a crosslinking activator.

In another aspect, an automotive bushing component manufactured by molding the rubber composition is provided. In one embodiment, the automotive bushing component may be selected from a group consisting of a suspension, a stabilizer, and a subframe.

The rubber composition satisfies state properties (e.g., hardness, tensile strength, and modulus strength), dynamic characteristics (e.g., elastic modulus and dynamic strength), heat resistance, and fatigue endurance.

Therefore, the rubber composition has excellent vibration isolation in a vibration frequency area felt by a person and simultaneously satisfies fatigue endurance and can be useful as a variety of automotive bushing component materials.

Other aspects and embodiments of the disclosure are discussed below.

It is understood that the term "vehicle" or "vehicular" or other similar term as used herein is inclusive of motor vehicles such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed below.

DETAILED DESCRIPTION

Reference will now be made in detail to various embodiments of the present disclosure, examples of which are illustrated in the accompanying drawings and described below. While the disclosure will be described in conjunction with specific embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

The present disclosure relates to a rubber composition for improving a conflict relation between vibration isolation and fatigue endurance of a rubber material. Since the rubber composition has an effect of maintaining or improving endurance while improving vibration isolation by reducing hardness, vibration isolation and fatigue endurance required for the automotive bushing component can be simultaneously provided.

Each raw ingredient and a composition ratio configuring the rubber bushing composition will be described below in more detail.

(1) Rubber Component

Rubber bushing in the related art was used by mixing natural rubber and butadiene rubber as base polymers. The butadiene rubber has large mobility and advantageous resilience because intermolecular rotational energy is very small to improve dynamic performance of the rubber and thus an effect of improving vibration isolation can be expected. However, the natural rubber and the butadiene rubber in the rubber composition may be easily phase-separated by physical combination and as a result, a mechanical property and fatigue endurance deteriorate.

Therefore, in the present disclosure, as the base polymer, the natural rubber is included alone.

(2) Filler

A filler is added for reinforcing rigidity such as tensile strength and compressive strength of the composition. Further, a dynamic characteristic of the composition can be controlled by adjusting a kind, a size, a content, and like of the filler. When a large amount of filler having a small particle size is injected to the rubber composition, the rigidity of the composition may be increased, but internal heat loss (e.g., hysteresis) during repeated behavior due to external load and displacement increases and the dynamic characteristic tends to deteriorate. Accordingly, to simultaneously satisfy endurance and dynamic performance of the rubber, it is important to design appropriate selection and content of the filler.

In one embodiment, carbon black is used as the filler. The carbon black is classified into super abrasion furnace (SAF), intermediate super-abrasion furnace (ISAF), high abrasion furnace (HAF), fast extruding furnace (FEF), general purpose furnace (GPF), semi reinforcing furnace (SRF), fine thermal (FT), and medium thermal (MT) according to a particle size.

In one embodiment, FEF, HAF, or a mixture thereof is used as the carbon black filler. The FEF may particularly use N550 series (e.g., diameter=42 nm) and have the density of 20.0 to 24.0 lb/ft$^3$ and the process oil content of 115 to 127 cm$^3$/100 g. The HAF may particularly use N330 series (e.g., diameter=32 nm).

In the rubber composition, shore A hardness may be adjusted in a range of 45 to 55 Hs by selecting and using the carbon black filler.

The carbon black filler is included in a range of 20 to 30 parts by weight based on 100 parts by weight of rubber. When the content of carbon black filler is less than 20 parts by weight, a state property may rapidly deteriorate, and when the content thereof is more than 30 parts by weight, the dynamic performance is decreased and it is difficult to provide moldability when the component is molded.

(3) Antioxidant

The antioxidant is used for preventing oxidation. In the rubber bushing in the related art, the antioxidant is 2-mercaptobenzimidazole (MB). However, it is known that 2-mercaptobenzimidazole (MB) reacts with a crosslinking accelerator to have an undesirable effect on a crosslinking system structure and thus a molding time may be delayed.

In one embodiment, the antioxidant is a mixture of 2,2,4-trimethyl-1,2-dihydroquinoline (TMQ) and N-isopropyl-N'-phenyl-p-phenylenediamine (IPPD). The TMQ and the IPPD used as the antioxidant do not cause an additional reaction with the crosslinking accelerator component and thus do not affect the crosslinking system structure.

The 2,2,4-trimethyl-1,2-dihydroquinoline (TMQ) used as the antioxidant may be included in a range of a maximum of 1.5 parts by weight, or 0.5 to 1.5 parts by weight based on 100 parts by weight of the rubber. When the content of 2,2,4-trimethyl-1,2-dihydroquinoline (TMQ) is more than 1.5 parts by weight, physical properties may deteriorate due to surface blooming.

The N-isopropyl-N'-phenyl-p-phenylenediamine (IPPD) used as the antioxidant has advantages of having excellent stability at a high temperature and maintaining the effects for a long time as the ozoneantioxidant. The N-isopropyl-N'-phenyl-p-phenylenediamine (IPPD) may be included in a range of a maximum of 2 parts by weight, or 1 to 2 parts by weight based on 100 parts by weight of the rubber. When the content of N-isopropyl-N'-phenyl-p-phenylenediamine (IPPD) is more than 2 parts by weight, the physical properties may deteriorate due to surface blooming.

If necessary, a paraffin-based ozone antioxidant may be additionally included. The paraffin-based ozone antioxidant may also include Antilux 500 (Rhein Chemie) as a commercial product. The paraffin-based ozone antioxidant may be included in a range of a maximum of 2 parts by weight, or 1 to 2 parts by weight based on 100 parts by weight of the rubber.

(4) Sulfur Crosslinker

To cure natural rubber and exhibit a mechanical property of the rubber, a sulfur crosslinking system having favorable fatigue performance is applied. That is, in a crosslinking process for curing the natural rubber, a sulfur crosslinker, a crosslinking accelerator, and a crosslinking activator are used.

In the crosslinking system of the rubber composition, as the sulfur (S) content is increased, the crosslink-bonding structure is flexible and has resistance to external cyclic fatigue load. However, a sulfur (S)-carbon (C) bond formed by the sulfur crosslinking system is vulnerable to an external thermal load due to low bonding energy. In the sulfur crosslinking system, research to improve the problem of degradation of heat resistance has been conducted, but the problem needs to be still improved due to a conflict problem to an external repeated fatigue load at room temperatures.

The sulfur crosslinker may be used in a range of 0.8 to 1.5 parts by weight based on 100 parts by weight of the rubber. When the content of sulfur crosslinker is less than 0.8 part by weight, the endurance of the rubber may be decreased, and when the content thereof is more than 1.5 parts by weight, a problem that heat resistance to a used limit temperature is not satisfied may occur.

(5) Crosslinking Accelerator

In one embodiment, the crosslinking accelerator is a mixture of N-cyclohexyl 2-benzothiazole sulfenamide (CBS) and tetramethylthiuram disulfide (TMTD).

As the crosslinking accelerator, the N-cyclohexyl 2-benzothiazole sulfenamide (CBS) may be included in a range of 0.5 to 2 parts by weight, or 1 to 2 parts by weight based on 100 parts by weight of the rubber. When the content of N-cyclohexyl 2-benzothiazole sulfenamide (CBS) is less than 0.5 part by weight, it may be difficult to provide stable physical properties due to reduction of the crosslinking time, and when the content thereof is more than 2 parts by weight, deterioration of the rubber property and the productivity problem may be caused due to the delay of the crosslinking time.

As the crosslinking accelerator, the tetramethylthiuram disulfide (TMTD) may be included in a range of 0.2 to 1 part by weight, or 0.2 to 0.8 part by weight based on 100 parts by weight of the rubber. When the content of tetramethylthiuram disulfide (TMTD) is less than 0.2 part by weight, the deterioration of the rubber property and the productivity problem may be caused due to the delay of the crosslinking time, and when the content thereof is more than 1 part by weight, it may be difficult to provide the stable properties due to the reduction of the crosslinking time.

A structure of the sulfur crosslinking system is determined by a weight ratio of the sulfur crosslinker and the crosslinking accelerator. The structure of the sulfur crosslinking system is classified into efficient vulcanization, semi-efficient vulcanization, and conventional vulcanization crosslinking systems by increasing a weight ratio of the sulfur/crosslinking accelerator. Particularly, the structure of the sulfur crosslinking system may be classified into the efficient vulcanization when the weight ratio of the sulfur/crosslinking accelerator is less than 0.5, the semi-efficient vulcanization when the weight ratio is in a range of 0.5 to 1.0, and the conventional vulcanization when the weight ratio is equal to or more than 1.0. In the efficient vulcanization crosslinking system, the heat resistance of the rubber composition may be increased, but the fatigue endurance is weakened, and in the conventional vulcanization crosslinking system, the fatigue endurance of the rubber composition is increased, but the heat resistance is weak. Further, in the semi-efficient vulcanization crosslinking system, the physical property of the rubber composition has an intermediate property of the efficient vulcanization and the conventional vulcanization.

The rubber bushing in the related art may maintain the efficient vulcanization crosslinking system by adjusting the weight ratio of the sulfur/crosslinking accelerator to 0.33. That is, efforts have been made to keep the length of the crosslinking chain to be short while keeping the sulfur (S) content of the rubber composition to be low and thus to keep the heat resistance of the rubber to be good. However, in the case of the rubber bushing, when the efficient vulcanization crosslinking system is applied, deterioration of fatigue endurance becomes a problem.

As a result, the semi-efficient vulcanization crosslinking system approximating to the efficient vulcanization crosslinking system is adopted by adjusting the weight ratio of the sulfur/crosslinking accelerator in a range of 0.4 to 0.7. That is, the weight ratio of the sulfur/crosslinking accelerator is kept to be higher than that in the related art to improve fatigue endurance while maintaining excellent heat resistance by the efficient vulcanization crosslinking system.

By adjusting the weight ratio of the sulfur/crosslinking accelerator, an absolute content of sulfur is limited to 0.8 to 1.5 parts by weight and the total content of the crosslinking accelerator (CBS+TMTD) is limited to 1.8 to 2.2 parts by weight. Even though the weight ratio of the sulfur/crosslinking accelerator is maintained in a range of 0.4 to 0.7, when the sulfur content is more than 1.5 parts by weight, the heat resistance may deteriorate, and when the total content of the crosslinking accelerator is less than 1.8 parts by weight, the fatigue endurance may deteriorate.

As described above, in order to manufacture the desired rubber bushing having simultaneously advanced variation insulation and fatigue endurance which are desired, it is very important to adjust the sulfur content, the crosslinking accelerator content, and the weight ratio of the sulfur/crosslinking accelerator.

(6) Crosslinking Activator

The rubber composition includes a crosslinking activator in order to activate the crosslinking accelerator. As the crosslinking activator, a mixture of zinc oxide (ZnO) and stearic acid is used.

As the crosslinking activator, the content of zinc oxide (ZnO) is 3 to 5 parts by weight based on 100 parts by weight of natural rubber. When the content of zinc oxide (ZnO) is less than 3 parts by weight, crosslinking activity is lowered and it is expected that the mechanical property and the fatigue endurance of the mixture are lowered, and when the content thereof is more than 5 parts by weight, it is difficult to provide a stable mixing time and temperature condition and a distribution rate during mixing may be increased.

As the crosslinking activator, the content of stearic acid is 1.5 to 3 parts by weight based on 100 parts by weight of natural rubber. When the content of stearic acid is less than 1.5 parts by weight, crosslinking activity is lowered and it is expected that the mechanical property and the fatigue endurance of the mixture are lowered, and when the content thereof is more than 3 parts by weight, it is difficult to provide a stable mixing time and temperature condition.

(7) Other Additives

In the rubber composition, the use of additives other than the components described above is not recommended. Particularly, the addition of a plasticizer is limited.

The rubber composition has shore A hardness in a range of 45 Hs to 55 Hs and excellent compound-ability without adding the plasticizer. When the plasticizer is added to the rubber composition, the deterioration of the physical properties of the mixture may be rather caused, and thus the addition of the plasticizer is excluded.

That is, the commercialized rubber bushing in the related art is manufactured by mixing 15 types of raw ingredients to have a rather disadvantageous effect on controlling conflict performance of the rubber by mixing a variety of raw ingredients. Further, a decrease in manufacturing productivity according to an increase in crosslinking time and an increase in costs due to adding processes are caused by mixing a variety of raw ingredients. However, the present disclosure has an effect of reducing costs by simplifying a manufacturing process compared with the rubber bushing in the related art because the rubber bushing is manufactured by mixing 10 types of raw ingredients.

As described above, the present disclosure will be described in more detail based on the following Examples, and the present disclosure is not limited thereto.

EXAMPLES

The following examples illustrate the disclosure and are not intended to limit the same.

Examples 1 to 3 and Comparative Examples 1 to 3. Manufacture of Rubber Bushing A rubber bushing composition was prepared by mixing raw ingredients illustrated in Table 1 below with a predetermined composition ratio and a specimen for evaluating physical properties was prepared by using a compressor.

The rubber bushing compositions include the following raw ingredients:

(1) Rubber
① Natural rubber (NR): Malaysian Natural Rubber, SMR CV60
② Butadiene rubber (BR): LANXESS company, Buna CB24
(2) Filler
① HAF: N330 series, d=28-36 nm
② FEF: N550 series, d=39-55 nm
③ SRF: N774 series, d=70-96 nm
(3) Antioxidant
① TMQ: 2,2,4-trimethyl-1,2-dihydroquinoline
② IPPD: N-isopropyl-N'-phenyl-p-phenylenediamine
③ Antilux: Paraffin-based ozone antioxidant, Antilux 500, Rhein Chemie company)
(4) Crosslinking accelerator
① CBS: N-cyclohexyl 2-benzothiazole sulfenamide
② TMTD: Tetramethylthiuram disulfide
(5) Crosslinking activator
① ZnO: Zinc oxide
② St: Stearic acid

TABLE 1

| Composition (part by weight) | | Example 1 | Example 2 | Example 3 | Comparative Example 1 | Comparative Example 2 | Comparative Example 3 |
|---|---|---|---|---|---|---|---|
| Rubber | NR | 100 | 100 | 100 | 70 | 100 | 100 |
|  | BR | — | — | — | 30 | — | — |
| Carbon black | HAF | — | — | — | 10 | 10 | 20 |
|  | FEF | 20 | 20 | 20 | — | 10 | — |
|  | SRF | — | — | — | 15 | — | — |
| Antioxidant | TMQ | 1.5 | 1.5 | 1.5 | 1.5 | 1.5 | 1.5 |
|  | IPPD | 1.5 | 1.5 | 1.5 | 2 | 1 | 1 |
|  | Antilux | 2 | 2 | 2 | 1 | 2 | 2 |
| Sulfur | S | 1.0 | 0.8 | 0.92 | 1 | 0.5 | 0.5 |
| Crosslinking accelerator | CBS | 1.25 | 1.25 | 1.44 | 2 | 0.5 | 0.5 |
|  | TMTD | 0.6 | 0.6 | 0.7 | 1 | 1 | 1 |
| Crosslinking activator | ZnO | 3 | 3 | 3 | 5 | 3 | 3 |
|  | St | 1.5 | 1.5 | 1.5 | 1.5 | 3 | 3 |
| Sulfur/crosslinking accelerator (weight ratio) |  | 0.54 | 0.43 | 0.43 | 0.33 | 0.33 | 0.33 |

TEST EXAMPLES

Test Example 1. Evaluation of Characteristics of Rubber Specimen and Product To evaluate characteristics of a rubber specimen manufactured in Examples 1 to 3 and Comparative Examples 1 to 3, the following items were tested and the results were compared and evaluated.

(1) Evaluation of State Properties:

Shore A hardness was measured by an evaluation method of KS M 6784. Tensile strength and modulus were measured in accordance with dumbbell type 3 according to KS M 6782.

(2) Evaluation of Dynamic Modulus:

A dynamic modulus was verified by a storage modulus G' and measured under conditions of strain of 0.5% and a frequency of 1 Hz at a temperature of −120° C. to 70° C.

(3) Evaluation of Dynamic Ratio:

A dynamic ratio was evaluated by using a material dynamic characteristic tester with a frequency while dynamically applying deformation of 2% from static elongation of 20%.

TABLE 2

| Evaluation item | | Example 1 | Example 2 | Example 3 | Comparative Example 1 | Comparative Example 2 | Comparative Example 2 |
|---|---|---|---|---|---|---|---|
| State properties | Hardness (Hs) | 46 | 45 | 47 | 44 | 48 | 46 |
|  | Tensile strength (kgf/cm$^2$) | 305 | 289 | 332 | 262 | 260 | 290 |
|  | M50 (MPa) | 0.8 | 0.8 | 0.9 | 0.6 | 0.9 | 0.6 |
|  | M100 (MPa) | 1.3 | 1.3 | 1.5 | 1 | 1.4 | 1 |
| Elastic modulus (G'@1 Hz) (MPa) | −40° C. | 3.91 | 4.58 | 3.69 | 5.19 | 5.35 | 4.4 |
|  | −20° C. | 2.61 | 2.91 | 2.38 | 3.34 | 3.5 | 3.32 |
|  | 0° C. | 2.32 | 2.44 | 2.12 | 2.79 | 2.94 | 3.03 |
|  | 24° C. | 2.08 | 2.10 | 1.92 | 2.34 | 2.55 | 2.67 |
|  | 60° C. | 1.8 | 1.61 | 1.72 | 1.6 | 2.03 | 2.36 |
| Dynamic ratio | 50% @ 24° C. | 2.60 | 2.63 | 2.13 | 3.90 | 2.83 | 4.45 |

According to the test result in Table 2, in the specimens in Examples 1 to 3, it can be seen that the hardness is lowly maintained at 45 to 55 Hs and state properties such as tensile strength and modulus strength are excellent as compared with Comparative Examples 1 to 3. Further, even in a temperature-dependent dynamic characteristic, in the specimens in Examples 1 to 3, it is verified that a dynamic modulus (storage modulus, G') and a dynamic ratio are low compared with the specimens of Comparative Examples 1 and 2 and thus it can be seen that vibration isolation is more excellent. Particularly, it can be seen that the specimen in Example 3 has an excellent dynamic modulus in an overall temperature range and the dynamic modulus at an interest temperature section (0° C. to 60° C.) is also optimal.

Test Example 2. Evaluation of Heat Resistance (1) Measurement of change rate of state properties after aging: With respect to the specimens prepared in Examples 1 and 2 and Comparative Examples 1 to 3, a change rate for state properties after aging for 1,000 hrs at a temperature of 70° C. was measured by using an efficient vulcanization (EV) system. The result is illustrated in Table 3 below.

TABLE 3

| Items | Expected value | Example 1 | Example 2 | Comparative Example 1 | Comparative Example 2 | Comparative Example 3 |
|---|---|---|---|---|---|---|
| Sulfur/crosslinking accelerator (weight ratio) | — | 0.54 | 0.43 | 0.33 | 0.33 | 0.33 |

TABLE 3-continued

| Items | | Expected value | Example 1 | Example 2 | Comparative Example 1 | Comparative Example 2 | Comparative Example 3 |
|---|---|---|---|---|---|---|---|
| Vulcanization system | | — | EV | EV | EV | EV | EV |
| State property | Hardness (Hs) | — | 46 | 45 | 44 | 48 | 46 |
| | Tensile strength (kgf/cm$^2$) | — | 305 | 289 | 262 | 260 | 290 |
| Aging property | Hs(Hs) | −2 to 10 | 6 | 4 | 4 | 4 | 6 |
| | Tsb(%) | −20 or less | −10 | 2 | 2 | −25 | −15 |
| | Eb(%) | −30 or less | −16 | −10 | −15 | −24 | −19 |

When the sulfur content in the rubber composition is high and the weight ratio of the sulfur/crosslinking accelerator is large, the heat resistance may be poor. However, it can be verified that in the rubber specimens in Examples 1 and 2 proposed in the present disclosure, even though the sulfur content is high and the weight ratio of the sulfur/crosslinking accelerator is high compared with the specimens in Comparative Examples 1 to 3, the heat resistance is maintained to be good.

(2) Measurement of change rate of dynamic performance after aging: With respect to the specimens prepared in Examples 1 and 2 and Comparative Examples 1 to 3, a change rate for state properties after aging for 1,000 hrs at 70° C. was measured by using an efficient vulcanization (EV) system. The result is illustrated in Table 4 below.

TABLE 4

| Classification | | Measurement condition | Hardness (Hs) | G' (MPa) | G' (%) |
|---|---|---|---|---|---|
| Example | 1 | Initial | 46 | 2.32 | — |
| | | 1000 Hr | 52 | 2.54 | 9 |
| | 2 | Initial | 45 | 2.44 | — |
| | | 1000 Hr | 49 | 2.43 | 0 |
| Comparative Example | 1 | Initial | 44 | 2.79 | — |
| | | 1000 Hr | 48 | 3.29 | 18 |
| | 2 | Initial | 48 | 2.94 | — |
| | | 1000 Hr | 52 | 3.57 | 21 |
| | 3 | Initial | 46 | 3.0 | — |
| | | 1000 Hr | 52 | 2.52 | −16 |
| Commercial product_1 | | Initial | 44 | 1.92 | — |
| | | 1000 Hr | 47 | 1.98 | 3 |
| Commercial product_2 | | Initial | 47 | 2.40 | — |
| | | 1000 Hr | 52 | 2.95 | 23 |

Commercial product_1: Daeheung R&T Co., Ltd., mass-produced rubber mixture for engine mount
Commercial product_2: Pyung-Hwa Industrial Co., Ltd., mass-produced rubber mixture for engine mount The change rate of the dynamic performance in Table 4 tends to largely match the change rate of the state property. In the specimens in Examples 1 and 2, after aging for 1,000 hrs, there is almost no change in the modulus compared to the initial stage within 9% and there is almost no change in dynamic performance even compared with commercial product_2. On the contrary, it can be seen that in the specimens in Comparative Examples 1 to 3, there is a large change in the modulus compared to the initial stage as 16 to 21%.

Test Example 3. Evaluation of Fatigue Endurance

In the specimens prepared in Examples 1 to 3 and Comparative Examples 1 to 3, fatigue performance (fracture cycle) of the specimen was evaluated by using a fatigue tester (SAGINOMIYA). The result is illustrated in Table 5 below.

TABLE 5

| Classification | | Measurement load | Measurement section | Ks (N/mm) | K* (N/mm) | K*/Ks | Fracture cycle (times) |
|---|---|---|---|---|---|---|---|
| Example | 1 | 150N ± 150N @1 Hz, RT | 100 to 150N @1000 Cycle | 4.02 | 5.21 | 1.30 | 7,088 |
| | 2 | 150N ± 150N @1 Hz, RT | 100 to 150N @1000 Cycle | 3.98 | 5.07 | 1.27 | 5,145 |
| | 3 | 150N ± 150N @1 Hz, RT | 100 to 150N @1000 Cycle | 4.45 | 5.72 | 1.29 | 9,969 |
| Comparative Example | 1 | 150N ± 150N @1 Hz, RT | 100 to 150N @1000 Cycle | 2.41 | 3.73 | 1.55 | 2,331 |
| | 2 | 150N ± 150N @1 Hz, RT | 100 to 150N @1000 Cycle | 4.5 | 5.86 | 1.30 | 5,614 |
| | 3 | 150N ± 150N @1 Hz, RT | 100 to 150N @1000 Cycle | 2.91 | 3.98 | 1.37 | 2,539 |
| Commercial product_1 | | 150N ± 150N @1 Hz, RT | 100 to 150N @1000 Cycle | 3.79 | 4.77 | 1.26 | 3,135 |
| Commercial product_2 | | 150N ± 150N @1 Hz, RT | 100 to 150N @1000 Cycle | 4.54 | 6.11 | 1.35 | 7,289 |

Commercial product_1: Daeheung R&T Co., Ltd., mass-produced rubber mixture for engine mount
Commercial product_2: Pyung-Hwa Industrial Co., Ltd., mass-produced rubber mixture for engine mount According to Table 5, in the specimens of Examples 1 to 3, it can be seen that the number of times of fracture cycles is significantly high compared with Comparative Examples 1 to 3 and fatigue endurance is equal even compared with the commercial product.

As described above, the rubber composition proposed in the present disclosure has an effect of simultaneously improving vibration isolation and fatigue endurance having a conflict relation. Accordingly, the rubber composition of the present disclosure is useful as an automotive bushing component material.

The disclosure has been described in detail with reference to embodiments thereof. However, it will be appreciated by those skilled in the art that changes may be made in these embodiments without departing from the principles and spirit of the invention, the scope of which is defined in the appended claims and their equivalents. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A rubber bushing composition comprising:
    100 parts by weight of natural rubber;
    20 to 30 parts by weight of a fast extruding furnace (FEF), a high abrasion furnace (HAF), or a mixture thereof as a filler;
    0.5 to 1.5 parts by weight of 2,2,4-trimethyl-1,2-dihydroquinoline (TMQ) and 1 to 2 parts by weight of N-isopropyl-N'-phenyl-p-phenylenediamine (IPPD) as an antioxidant;
    0.8 to 1.5 parts by weight of a sulfur crosslinker;
    0.5 to 2 parts by weight of N-cyclohexyl 2-benzothiazole sulfenamide (CBS) and 0.2 to 1 part by weight of tetramethylthiuram disulfide (TMTD) as a crosslinking accelerator; and
    3 to 5 parts by weight of zinc oxide and 1.5 to 3 parts by weight of stearic acid as a crosslinking activator.

2. The rubber bushing composition of claim 1, wherein a weight ratio of the sulfur crosslinker to the crosslinking accelerator is in a range of 0.4 to 0.7.

3. The rubber bushing composition of claim 1, wherein the antioxidant further comprises a paraffin-based ozone antioxidant.

4. The rubber bushing composition of claim 3, wherein the rubber bushing composition comprises 1 to 2 parts by weight of the paraffin-based ozone antioxidant.

5. The rubber bushing composition of claim 1, wherein the rubber bushing composition comprises 1 to 2 parts by weight of CBS.

6. The rubber bushing composition of claim 5, wherein the rubber bushing composition comprises 0.2 to 0.8 parts by weight of TMTD.

7. The rubber bushing composition of claim 1, wherein the rubber bushing composition comprises 0.2 to 0.8 parts by weight of TMTD.

8. The rubber bushing composition of claim 1, wherein a shore A hardness of the rubber bushing composition is in a range of 45 to 55 Hs.

9. The rubber bushing composition of claim 1, wherein the filler comprises FEF.

10. The rubber bushing composition of claim 9, wherein the FEF is N550 carbon black.

11. The rubber bushing composition of claim 9, wherein the FEF has a density of 20 to 24 lb/ft$^3$.

12. The rubber bushing composition of claim 9, wherein the FEF has a process oil content of 115 to 127 cm$^3$/100 g.

13. The rubber bushing composition of claim 1, wherein the filler comprises HAF.

14. The rubber bushing composition of claim 13, wherein the HAF is a N330 carbon black.

15. The rubber bushing composition of claim 1, wherein a total amount of the crosslinking accelerator is 1.8 to 2.2 parts by weight.

16. An automotive bushing component comprising:
    a rubber composition having:
        100 parts by weight of natural rubber;
        20 to 30 parts by weight of a fast extruding furnace (FEF), a high abrasion furnace (HAF), or a mixture thereof as a filler;
        0.5 to 1.5 parts by weight of 2,2,4-trimethyl-1,2-dihydroquinoline (TMQ) and 1 to 2 parts by weight of N-isopropyl-N'-phenyl-p-phenylenediamine (IPPD) as an antioxidant;
        0.8 to 1.5 parts by weight of a sulfur crosslinker;
        0.5 to 2 parts by weight of N-cyclohexyl 2-benzothiazole sulfenamide (CBS) and 0.2 to 1 part by weight of tetramethylthiuram disulfide (TMTD) as a crosslinking accelerator; and
        3 to 5 parts by weight of zinc oxide and 1.5 to 3 parts by weight of stearic acid as a crosslinking activator.

17. The automotive bushing component of claim 16, wherein the bushing component is selected from a group consisting of a suspension, a stabilizer, and a subframe.

* * * * *